Sept. 10, 1957   MASAO YAMAURA ET AL   2,806,076
METHOD OF MANUFACTURING THE POROUS TUBE FOR
STORAGE BATTERY PLATE
Filed May 15, 1953
FIG. 1
FIG. 2
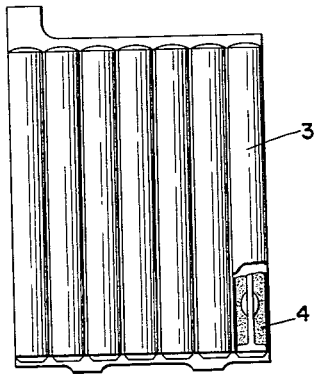
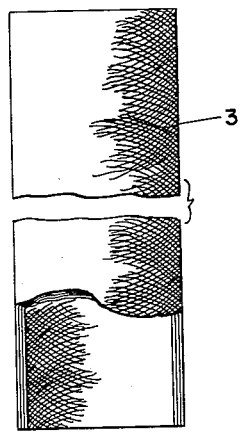
FIG. 4
FIG. 3
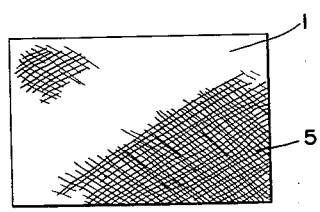
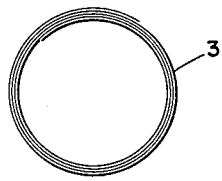
FIG. 5
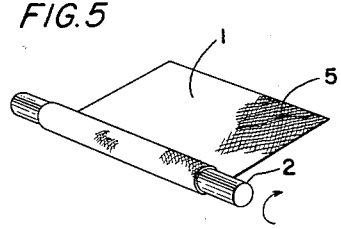
INVENTORS
MASAO YAMAURA
NOBUO NAKASEKO
BY *Watson, Cole, Grindle & Watson*
ATTORNEYS 2,806,076
Patented Sept. 10, 1957

2,806,076

METHOD OF MANUFACTURING THE POROUS TUBE FOR STORAGE BATTERY PLATE

Masao Yamaura and Nobuo Nakaseko, Takatsuki, Japan, assignors to Yuasa Battery Co. Ltd., Osaka, Japan, a corporation of Japan Application May 15, 1953, Serial No. 355,417

6 Claims. (Cl. 136—55)

This invention relates to a method of manufacturing porous tubes for the positive plates of the lead-acid storage battery known as ironclad battery. The ironclad type positive plate, in common use at present, is made up of a series of parallel rods with fins cast of lead antimonial alloy burned to supporting frames at top and bottom and enclosed in hard rubber tubes with numerous fine slots of about 0.1 to 0.3 mm. wide. The outer hard rubber tubes are tightly pressed against the supporting frames at top and bottom and hold active material in the space between the inner rods and tubes.

This type of tube may have several defects. To overcome these defects, it was proposed that the outer tubes be made of glass fiber filaments woven, knitted or braided into cloth. Another method was to make the tubes of strips of glass fiber wound on a mandrel producing an overlapped spiral seam and bound by rubber composition. These proposals, however, were not free from defects.

For the former fine glass fiber filaments must be used. A special complicated machine is required to weave, knit or braid these filaments into cloth and therefore production cost is very high. Although it may be possible to provide narrower apertures between woven or braided filaments in an attempt to reduce shedding of active material, it can not increase the battery capacity because of increased electrical resistance due to reduced porosity of woven or braided glass fiber cloth. Furthermore, the fineness of the material glass fiber causes earlier corrosion by acid due to larger reaction surface attacked by electrolyte, and shorter battery life.

In the latter method the outer tube made by winding glass fiber strips around a mandrel leaves a spiral seam extending over the whole length of the outer surface of the tube, which may break open, and accelerates washing out of active material retained in the tube through the broken part of the seam. This also results in shorter battery life.

This invention, for overcoming these defects, proposes a method of manufacturing strong corrosion resistant porous tubes at a reasonable cost. The method is as follows:

Referring to the accompanying drawings:

Figure 1 is a partial sectional elevation for a battery plate comprising porous tubes made in accordance with our invention.

Figure 2 is a partial sectional elevation on a larger scale of one of the tubes.

Figure 3 is a plan of Figure 2.

Figure 4 is a rectangular glass mat for a tube sprayed with acid-resisting adhesive.

Figure 5 illustrates a step in the process of manufacturing a tube and shows a rectangular fibrous glass mat wound on a mandrel.

The mat 1 is made of glass fiber filaments laid at oblique angles with each other and piled up to a thickness of between 0.1 and 0.2 mm. and cut into required rectangular size with its width equal to the tube 3 to be made. The mat 1 is then placed on a flat plate and its surface sprayed, entirely or partially, with acid-resisting synthetic resins, used as an adhesive agent, e. g., polyvinyl chloride dissolved in organic solvent or suspended in water, or early condensation products of phenol and formaldehyde. The adhesive agent evenly sprayed over the fiber mat 1 will concentrate on crosspoints of the fiber filaments 5 and leave numerous fine openings between them. Sulphuric acid, therefore, freely passes through these openings, and yet the tubes 3 have sufficient strength to prevent shedding of active material. The mat 1 is then rolled several times, applying a proper pressure, around a mandrel 2 to shape it into a tube 3.

The acid-resisting adhesive agent is sprayed all over the surface in the above method. However, a water soluble binder such as a gelatine solution may also be sprayed on one surface, entirely or partially, to give proper friction for easier rolling on the mandrel 2. The water soluble binder used dissolves and disappears during the process of plate formation, eliminating harmful effects on the battery performance. Acid-resisting adhesive agents and water soluble binders may also be used simultaneously. When all the length of the glass fiber mat 1 is rolled up, the mandrel 2 is removed and the tube 3 is dried.

In a modified method, the glass fiber mat sprayed beforehand with water soluble binders may also be rolled around the mandrel, and coated with acid-resisting adhesives on the outer surface of the tube, or after removing the mandrel the tube may be coated with adhesives on either or both the outer and inner surface and dried.

In another modified method, additional glass fiber mat, sprayed or soaked with adhesives different in kinds and volume, or consisting of filaments of varied diameters, may also be rolled around the first one.

Concentrated adhesive may also be used to reinforce both ends of the tube.

The tubes made are processed into the battery plates just as the conventional rubber tubes for ironclad storage battery plates.

The same process may also be employed for manufacturing negative plates.

The characteristic features of the tube according to this invention are as follows:

(a) As the tube is a rolled glass fiber mat consisting of several thin layers, the apertures between the filaments are very narrow and uniform, and therefore the active material is not allowed to shed out.

(b) The high porosity, reaching about 90 percent, facilitates freer acid circulation, reduces internal electrical resistance, and increases the battery capacity remarkably compared with the conventional types.

(c) The tube itself consists of acid-resisting material, so that non-corrosion by oxidation or other chemical reactions is insured.

(d) This tube, being rolled up several time, has no seam, and completely does away with defects inherent to existence of a seam on the tube surface. Therefore, the life of the battery plate is prolonged.

(e) For weaving, knitting or braiding glass fiber cloth, very fine fiber filaments should be selected for use. However, the material filaments used in this invention need not be fine, on the contrary coarser filaments are preferable. They never get dissolved into the acid even if left in it for a long time.

(f) The thickness of the tube can be varied simply by changing the number of rolls or thickness of the mats.

(g) In manufacturing the glass fiber mat, the filaments are laid across each other instead of woven, enabling mass production and reduction in costs.

The above explanation on the manufacturing of glass fiber tube is also applicable to other kinds of fibers having acid-resisting features.

What we claim is.

1. A porous tube for a storage battery plate comprising a hollow, linear tube containing active battery material, said tube having ends perpendicular to the longitudinal axis of said tube and formed with a coil of glass fiber mat fabricated of filaments laid at oblique angles and impregnated with an acid reissting adhesive, said coil being wrapped in a spiral in a plane perpendicular to the axis of the tube, said tube having a single linear overlap seam within said tube bore and a single linear overlap seam on the outside surface of said tube both parallel to the longitudinal axis of said tube.

2. In a storage battery, a positive plate including one or more porous tubes containing active battery material within the bore thereof, each of said tubes comprising a hollow, linear cylinder having ends substantially perpendicular to the longitudinal axis of said tube and formed with a tightly wrapped coil of glass fiber mat extending without seams for the full length of the tube and having a single overlap seam within the tube bore and a single overlap seam on the outside surface of the tube defined by the ends of said mat, both of said seams extending the length of the tube without coiling.

3. The combination of claim 2 in which each tube includes a second mat tightly wrapped around the coil formed by the first mat and extending without seams for the full length of the tube.

4. In a storage battery, a positive plate including one or more porous tubes containing active battery material within the bore thereof, each of said tubes comprising a hollow, linear cylinder having ends substantially perpendicular to the longitudinal axis of said tube and formed with a tightly wrapped coil of glass fiber mat fabricated of filaments laid at oblique angles and impregnated with an acid-resisting adhesive extending without seams for the full length of the tube and having a single overlap seam within the tube bore and a single overlap seam on the outside surface of the tube defined by the ends of said mat, both of said seams extending the length of the tube without coiling.

5. The combination of claim 4 in which each tube includes a second mat tightly wrapped around the coil formed by the first mat and extending without seams for the full length of the tube.

6. In a storage battery, a positive plate including one or more porous tubes containing active battery material within the bore thereof, each of said tubes comprising a hollow, linear cylinder having ends substantially perpendicular to the longitudinal axis of said tube and formed with a tightly wrapped coil of glass fiber mat fabricated of filaments laid at oblique angles and impregnated with an acid-resisting adhesive extending without seams for the full length of the tube and having a single overlap seam within the tube bore and a single overlap seam on the outside surface of the tube defined by the ends of said mat, both said seams extending parallel to the axis of the tube for the full length thereof.

References Cited in the file of this patent

UNITED STATES PATENTS

| | | |
|---|---|---|
| 2,015,006 | Ekisler | Sept. 17, 1935 |
| 2,131,024 | Cordts | Sept. 27, 1938 |
| 2,168,366 | Slayter | Aug. 8, 1939 |
| 2,195,211 | Hall | Mar. 26, 1940 |
| 2,195,212 | Hall | Mar. 26, 1940 |
| 2,574,211 | Modigliani | Nov. 6, 1951 |
| 2,609,319 | Boge | Sept. 2, 1952 |
| 2,711,982 | Straka | June 28, 1955 |